United States Patent
Kim et al.

(10) Patent No.: US 10,421,333 B2
(45) Date of Patent: Sep. 24, 2019

(54) SYSTEM OF AIR-CONDITIONING SEAT FOR VEHICLE AND METHOD FOR CONTROLLING THE SAME

(71) Applicants: HYUNDAI DYMOS INCORPORATED, Seosan-si, Chungcheongnam-do (KR); INZICONTROLS CO., LTD., Siheung-si, Gyeonggi-do (KR)

(72) Inventors: Do Hyung Kim, Yongin-si (KR); Ho Sub Lim, Seoul (KR); Myung Jin Lee, Anyang-si (KR); Seung Jae Kim, Hwaseong-si (KR); Jong Dae Lim, Ansan-si (KR); Sang Hyun Park, Siheung-si (KR); Eun Sang Cho, Siheung-si (KR); Hyeok Lae Park, Seoul (KR)

(73) Assignees: Hyundai Dymos Incorporated, Seosan-si, Chungcheongnam-do (KR); Inzicontrols Co., Ltd., Siheung-si, Gyeonggi-do (KR)

(*) Notice: Subject to any disclaimer, the term of this patent is extended or adjusted under 35 U.S.C. 154(b) by 231 days.

(21) Appl. No.: 15/375,636

(22) Filed: Dec. 12, 2016

(65) Prior Publication Data
US 2017/0182862 A1 Jun. 29, 2017

(30) Foreign Application Priority Data
Dec. 24, 2015 (KR) .......................... 10-2015-0185785

(51) Int. Cl.
*B60H 1/00* (2006.01)
*B60N 2/56* (2006.01)

(52) U.S. Cl.
CPC ..... *B60H 1/00285* (2013.01); *B60H 1/00792* (2013.01); *B60N 2/5635* (2013.01); *B60N 2/5657* (2013.01); *B60H 1/00842* (2013.01)

(58) Field of Classification Search
CPC ............ B60H 1/00285; B60H 1/00792; B60H 1/00842; B60N 2/5635; B60N 2/5657
(Continued)

(56) References Cited

U.S. PATENT DOCUMENTS 6,059,018 A * 5/2000 Yoshinori .......... B60H 1/00285
165/41
6,079,485 A * 6/2000 Esaki ................. B60H 1/00285
165/42

(Continued)

FOREIGN PATENT DOCUMENTS

CN   102189912 A   9/2011
JP   2005-021483 A   1/2005
(Continued)

OTHER PUBLICATIONS

Office Action in Korean Application No. 10-2015-0185785 dated Apr. 28, 2017, 6 pages, untranslated.
(Continued)

*Primary Examiner* — Gregory L Huson
*Assistant Examiner* — Dana K Tighe
(74) *Attorney, Agent, or Firm* — Brinks Gilson & Lione

(57) ABSTRACT

The present disclosure provides a system of air-conditioning a seat for a vehicle and a method for controlling the same. The system of air-conditioning a seat for a vehicle includes: a blower disposed below the seat of the vehicle and configured to blow air onto a body contact surface; a first temperature sensor configured to detect a temperature of a front end of a suction hole of the blower; a second temperature sensor configured to detect a temperature of the body contact
(Continued)

surface; a third temperature sensor configured to detect a room temperature of the vehicle; and an HVAC control unit configured to control an air-conditioning system of the vehicle. The HVAC control unit determines a blow direction mode of the air-conditioning system of the vehicle based on the temperatures detected by the first, the second, and the third temperature sensors when the blower is actuated.

10 Claims, 4 Drawing Sheets

(58) Field of Classification Search
USPC .......................................................... 454/75
See application file for complete search history.

(56) References Cited

U.S. PATENT DOCUMENTS

| | | | | |
|---|---|---|---|---|
| 6,722,148 | B2* | 4/2004 | Aoki | B60H 1/00285 |
| | | | | 219/217 |
| 6,793,016 | B2* | 9/2004 | Aoki | B60H 1/00285 |
| | | | | 165/202 |
| 6,928,829 | B2* | 8/2005 | Kamiya | B60N 2/0244 |
| | | | | 297/452.42 |
| 6,962,196 | B2* | 11/2005 | Tsunoda | B60H 1/0075 |
| | | | | 165/203 |
| 7,380,587 | B2* | 6/2008 | Naruse | B60H 1/00028 |
| | | | | 165/202 |
| 9,004,993 | B2* | 4/2015 | Fujii | B60H 1/00285 |
| | | | | 297/180.13 |
| 2009/0218855 | A1* | 9/2009 | Wolas | A47C 7/74 |
| | | | | 297/180.14 |
| 2009/0229785 | A1 | 9/2009 | Kadle et al. | |
| 2012/0129439 | A1* | 5/2012 | Ota | B60H 1/242 |
| | | | | 454/120 |

FOREIGN PATENT DOCUMENTS

| | | |
|---|---|---|
| JP | 2006-035952 A | 2/2006 |
| JP | 2011-011713 A | 1/2011 |
| KR | 10-2009-0075982 A | 7/2009 |
| KR | 10-1201301 B1 | 11/2012 |
| KR | 10-2014-0127776 A | 11/2014 |

OTHER PUBLICATIONS

Chinese Office Action for Chinese Application No. 2018112802216910 dated Dec. 3, 2018 (11 pgs).

* cited by examiner

SYSTEM OF AIR-CONDITIONING SEAT FOR VEHICLE AND METHOD FOR CONTROLLING THE SAME

CROSS-REFERENCE TO RELATED APPLICATION

This application claims priority to and the benefit of Korean Patent Application No. 10-2015-0185785 filed on Dec. 24, 2015, which is incorporated herein by reference in its entirety.

FIELD

The present disclosure relates to a system of air-conditioning a seat for a vehicle and a method for controlling the same which rapidly provide cooling air in link with an air-conditioning system of the vehicle.

BACKGROUND

The statements in this section merely provide background information related to the present disclosure and may not constitute prior art.

In recent years, ventilation seats have been mounted on vehicles as an advanced specification for providing a more comfort driving environment to a driver when driving the vehicle in a high-temperature environment such as summer. The ventilation seat that autonomously includes an air-conditioning system suctions air by using a blower and provides the suctioned air to a seating surface or a back surface of the seat to cool down the driver.

Since the ventilation seat in the related art is formed of a structure that just suctions and discharges the air by the blower, when a room temperature of the vehicle is high, warm air is suctioned and discharged, and as a result, an initial cooling performance is not satisfactory.

SUMMARY

The present disclosure provides a system of air-conditioning a seat for a vehicle and a method for controlling the same which rapidly provide cooling air in link with an air-conditioning system of the vehicle according to a temperature to create a comfortable driving environment to a driver.

One form of the present disclosure provides a system of air-conditioning a seat for a vehicle, including: a blower disposed below the seat of the vehicle and configured to blow air onto a body contact surface; a first temperature sensor configured to detect a temperature of a front end of a suction hole of the blower; a second temperature sensor configured to detect a temperature of the body contact surface; a third temperature sensor configured to detect a room temperature of the vehicle; and an HVAC control unit configured to control an air-conditioning system of the vehicle, and the HVAC control unit determines a blow direction mode of the air-conditioning system of the vehicle based on the temperatures detected by the first, the second, and the third temperature sensors when the blower is actuated.

The HVAC control unit may determine the air-conditioning system of the vehicle in a mode in which the air is blown in both a face direction and a lower leg direction when the blower is actuated when the room temperature is higher than a predetermined reference temperature.

The HVAC control unit may determine the air-conditioning system of the vehicle in a mode in which the air is blown in the lower leg direction when the blower is actuated when the room temperature is equal to or lower than the predetermined reference temperature, and the temperature of the body contact surface and the temperature of the front end of the suction hole of the blower are higher than the reference temperature.

The HVAC control unit may determine the air-conditioning system of the vehicle in a predetermined blow direction mode when the room temperature is equal to or lower than the predetermined reference temperature and at least one of the temperature of the body contact surface or the temperature of the front end of the suction hole of the blower is equal to or lower than the reference temperature.

The reference temperature may be a target temperature pre-stored in the air-conditioning system of the vehicle.

Another form of the present disclosure provides a method for controlling a system of air-conditioning a seat for a vehicle, which includes a blower disposed below the seat of the vehicle and configured to blow air onto a body contact surface, including: detecting a temperature of the body contact surface, a temperature of a front end of a suction hole of the blower, and a room temperature of the vehicle; and determining a blow direction mode of an air-conditioning system of the vehicle based on temperatures detected by the first, the second, and the third temperature sensors when the blower is actuated.

In the determining of the mode, the air-conditioning system of the vehicle may be determined in a mode in which the air is blown in both a face direction and a lower leg direction when the room temperature is higher than a predetermined reference temperature.

In the determining of the mode, the air-conditioning system of the vehicle may be determined in a mode in which the air is blown in the lower leg direction when the blower is actuated when the room temperature is equal to or lower than the predetermined reference temperature and the temperature of the body contact surface and the temperature of the front end of the suction hole of the blower are higher than the reference temperature.

In the determining of the mode, the air-conditioning system of the vehicle may be determined in a predetermined blow direction mode when the room temperature is equal to or lower than the predetermined reference temperature and at least one of the temperature of the body contact surface or the temperature of the front end of the suction hole of the blower is equal to or lower than the reference temperature.

The reference temperature may be a target temperature pre-stored in the air-conditioning system of the vehicle.

The method may further include: before the detecting of the temperature, determining an on/off state of the air-conditioning system of the vehicle; and determining whether the blower is actuated when the air-conditioning system of the vehicle is in the on state. In this case, when the air-conditioning system of the vehicle is in off state, the temperature detecting step and the mode determining step may not be performed and a control ends, and when the blower is actuated, the temperature detecting step may be performed and when the blower is not actuated, the air-conditioning system of the vehicle may be determined in a predetermined blow direction mode.

The method may further include: before the detecting of the temperature, determining whether the blower is actuated; determining an on/off state of the air-conditioning system of the vehicle when the blower is actuated; and turning on the air-conditioning system of the vehicle and setting a temperature of the air-conditioning system of the vehicle to lowest temperature when the air-conditioning system of the vehicle is in the off state. In this case, when the blower is not actuated, the temperature detecting step and the mode determining step may not be performed and a control may end, and the air-conditioning system of the vehicle may be in the on state or the temperature may be set to the lowest temperature and thereafter, the temperature detecting step may be performed.

According to one form of the present disclosure, a ventilation seat system and an HVAC of the vehicle interlock with each other to determine an HVAC blow direction mode based on a vehicle room temperature and a seat temperature.

In particular, when a driver rides on the vehicle while a room of the vehicle is very warm before driving, the HVAC provides cooling to an area where a blower of a ventilation seat suctions air by discharging cold air toward both a face and a lower leg to rapidly cool a whole interior environment and the seat.

Further, since a temperature of the seat contacting a body can be maintained to be high even though the room temperature of the vehicle is appropriately maintained, the HVAC discharges the cold air only toward the lower leg and the blower below the seat thus suctions the cooling air to enhance a seat cooling effect.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
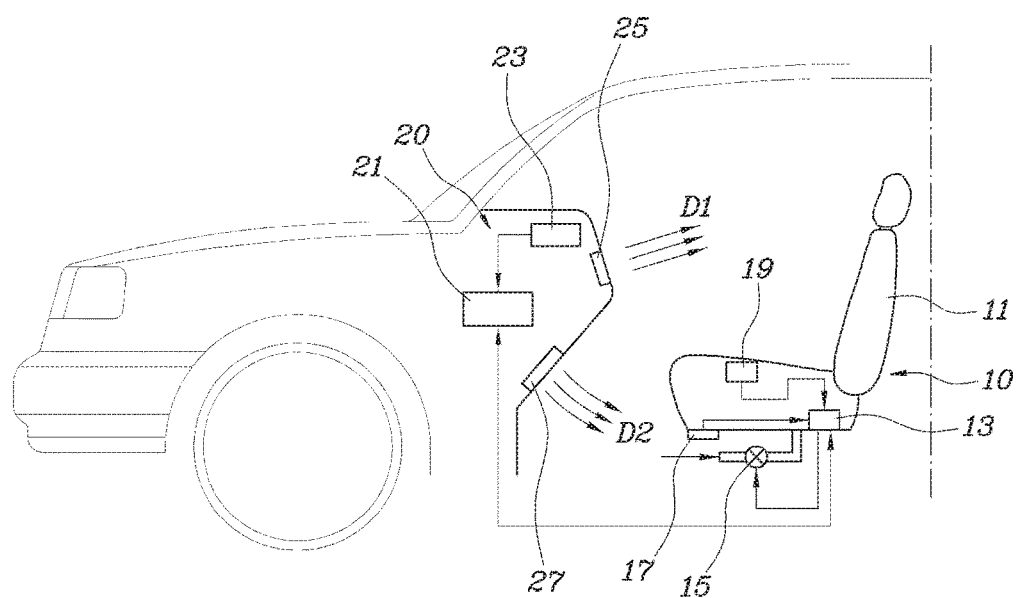
FIG. 1 is a configuration diagram of a system of air-conditioning a seat for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a configuration diagram of a system of air-conditioning a seat for a vehicle according to one form of the present disclosure.

Referring to FIG. 1, the system of air-conditioning a seat for a vehicle according to one form of the present disclosure may generally include a ventilation system 10 and a main air-conditioning system (heating ventilation and air conditioning system (HVAC), hereinafter, referred to as 'HVAC') 20 of the vehicle.

The ventilation seat system 10 for providing comfortability to a driver which seats by blowing air onto the surface of a vehicle seat may be configured to include a seat 11, a blower 15 installed below a seating portion of the seat, and a ventilation seat control unit 13 that operates the blower 15 according to a user input.

In particular, in one form of the present disclosure, the ventilation seat system 10 may further include two temperature sensors for interlocking of the ventilation seat system 10 and the HVAC 20. Two temperature sensors may include a first temperature sensor 17 that is disposed at a front end of an intake port of the blower 15 to detect a temperature the air suctioned by the blower and a second temperature sensor 19 that is installed in a part (hereinafter, referred to as a 'body contact surface') contacting the body of the driver, such as a seating surface or a back surface of the seat 11 to detect the temperature of the body contact surface of the driver.

The ventilation seat control unit 13 may turn on/off the operation of the blower 15 by receiving the user input by using a ventilation seat actuation switch (not illustrated) and receive signals for temperature values detected by the first and second temperature sensors 17 and 19 installed in the seat 11. The ventilation seat control unit 13 provides information on the temperature values detected by the first and second temperature sensors 17 and 19 to an HVAC control unit 21 of the vehicle to allow the ventilation seat system 10 and the HVAC 20 to interlock with each other. Data transmission/reception between the ventilation seat control unit 13 and the HVAC control unit 21 of the vehicle may be performed through CAN communication pre-installed in the vehicle or implemented through various wireless communication methods which are separately provided.

The HVAC 20 of the vehicle may include the HVAC control unit 21 that performs overall control of the HVAC, a third temperature sensor 23 detecting an internal temperature of the vehicle, and a plurality of blow holes blowing the air in a blow direction mode determined by the HVAC control unit 21. The HVAC control unit 21 controls a position of a damper (not illustrated) according to the determined blow direction mode to interrupt blowing in a specific direction and allow the blowing to be performed in the determined direction.

The blow direction mode determined by the HVAC control unit 21 may be a mode to blow the air in a face direction D1 through the blow hole 25 installed in the face direction, a mode to blow the air to a lower leg direction D2 through the blow hole 27 installed in the lower leg direction, and a mode to blow the air in both directions D1 and D2.

In one form of the present disclosure, the HVAC control unit 21 may determine the blow direction mode based on an operation state of the ventilation seat system, that is, whether the blower 14 is actuated and the temperatures detected by the first to third temperature sensors 17, 19, and 23 and a predetermined temperature.

Figure 2:
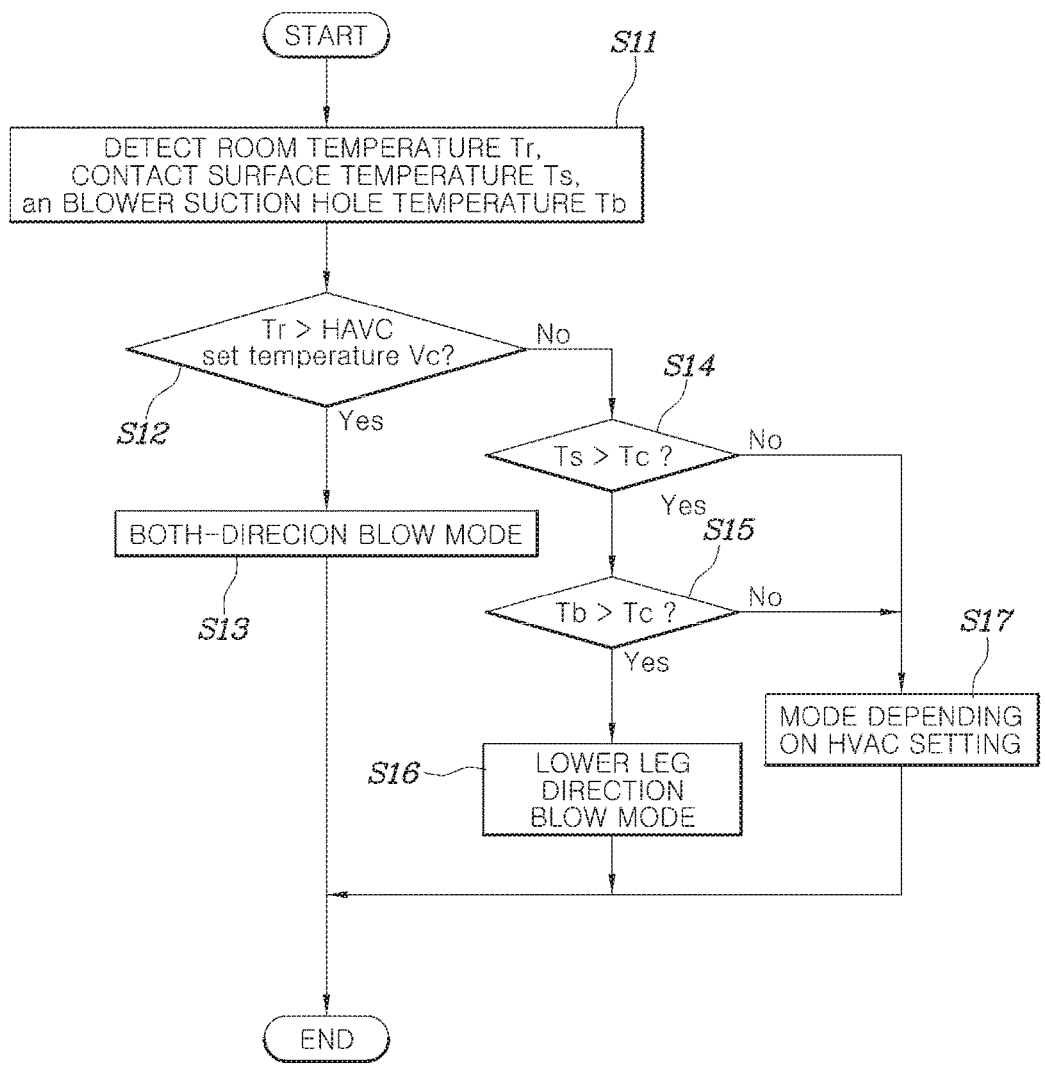
FIG. 2 is a flowchart of a method for controlling the system of air-conditioning a seat for a vehicle.

FIG. 2 is a flowchart of a method for controlling the system of air-conditioning a seat for a vehicle according to one form of the present disclosure. The system of air-conditioning a seat for a vehicle may be actuated by the control method illustrated in FIG. 2. The form illustrated in FIG. 2 may be performed when the ventilation seat system 10 is in an on state, that is, the blower 15 is operated and the HVAC 20 of the vehicle is also in the on state.

Referring to FIG. 2, the method for controlling the system of air-conditioning a seat for a vehicle may start from a temperature detecting step (S11) of detecting a temperature Tb of the front end of the air suction hole of the blower 15 provided in the ventilation seat system 10 by the first temperature sensor 17, detecting a temperature Ts of the body contact surface such as the seating surface or the back surface of the seat 11 by the second temperature sensor 19, and detecting a vehicle room temperature Tr by the third temperature sensor 23.

Subsequently, various temperatures detected in the temperature detecting step (S11) is compared with a predetermined reference temperature Tc and according to the comparison result, steps (S12 to S17) of determining the blow direction mode of the HVAC may be performed.

After the temperature detecting step (S11), the HVAC control unit 21 compares the room temperature Tr and the predetermined reference temperature Tc (S13). Herein, the predetermined reference temperature Tc may be, for example, a temperature set by personally inputting a temperature through an operation unit (not illustrated) of the HVAC 20 by the driver. As another example, the predetermined reference temperature Tc may be a temperature set by personally determining the temperature according to a pre-programmed algorithm by the HVAC control unit 21. Commonly in both types, the reference temperature Tc may be a target temperature which the HVAC intends to actuate and maintain.

As a result of comparing the room temperature Tr and the predetermined reference temperature Tc (S13), when the room temperature Tr is higher than the reference temperature Tc, the HVAC control unit 21 determines the both-direction blow mode as the blow direction mode. That in step S13, the HVAC control unit 21 needs to lower the temperature of the air which blown from the blower 15 to the seat 11 by rapidly lowering the room temperature of the vehicle and allowing the air suctioned by the blower 15 to have a low temperature when the room temperature of the vehicle is higher than the predetermined temperature. Accordingly, in step S13, the HAVC control unit 21 controls the HVAC so as to discharge the cold air in both directions by opening both interruption buffers disposed in the blow holes 25 and 27.

Meanwhile, in step S12, when the vehicle room temperature Tr is equal to or lower than the reference temperature Tc, the HVAC control unit 21 may compare the temperature of the body contact surface detected by the second temperature sensor 19 and the reference temperature Tc (S14) and compare the temperature Tb of the front end of the suction hole of the blower detected by the first temperature sensor 17 and the reference temperature Tc (S15). In an example illustrated in FIG. 2, it is illustrated that the body contact surface temperature Ts and the reference temperature Tc are compared with each other (S14) and thereafter, the suction hole front end temperature Tb and the reference temperature Tc are compared with each other (S15) in order, but the order of two steps may be changed.

In step S14, when the body contact surface temperature Ts is higher than the reference temperature Tc and the suction hole front end temperature Tb is higher than the reference temperature Tc, the room temperature maintains a level of the target temperature, but the temperature of the seat 11 is yet high, and as a result, the HVAC control unit 21 may control the blow direction mode so as to perform the blow of the HVAC in the lower-body direction which is a direction in which the blower 15 is installed in order to further lower the temperature of the seat (S16).

Conversely, when the body contact surface temperature Ts is equal to or lower than the reference temperature Tc and the suction hole front end temperature Tb is equal to or lower than the reference temperature Tc, both the room temperature and the temperature of the seat 11 maintain the target temperature or maintain a temperature lower than the target temperature to determine that a sufficiently cool state is secured, and as a result, the HVAC control unit 21 may control the blow direction so as to maintain the blow direction mode set by through the operation unit of the HVAC 20 (S17).

As described above, in one form of the present disclosure, the ventilation seat system and the HVAC of the vehicle interlock with each other to determine the HVAC blow direction mode based on the vehicle room temperature and the seat temperature. In particular, when a driver rides on the vehicle while a room of the vehicle is very warm before driving, the HVAC provides cooling air to an area where a blower of a ventilation seat suctions air by discharging cold air toward both a face and a lower leg to rapidly cool a whole interior environment and the seat. Further, since a temperature of the seat contacting a body can be maintained to be high even though the room temperature of the vehicle is appropriately maintained, the HVAC discharges the cold air only toward the lower leg and the blower below the seat thus suctions the cooling air to enhance a seat cooling effect.

Meanwhile, in one form of the present disclosure, before the temperature detecting step (S11) is performed, a process of preparing the actuation of the system of air-conditioning a seat for a vehicle may be performed according to a state of the HVAC system.

Figure 3:
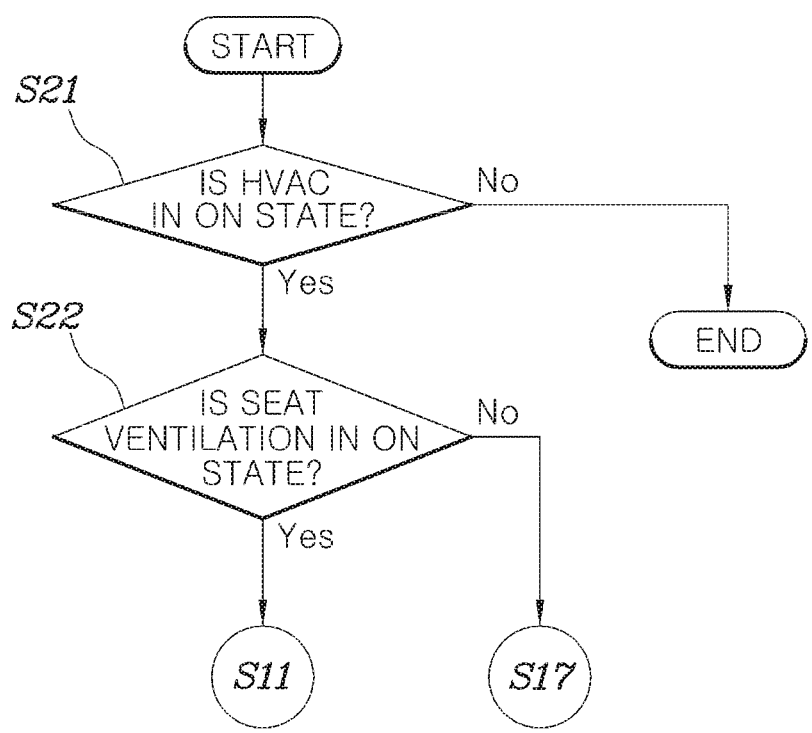
FIGS. 3 and 4 are flowcharts illustrating an actuation order depending on a state of a main air-conditioning system (HVAC) in the method for controlling the system of air-conditioning a seat for a vehicle.
Figure 4:
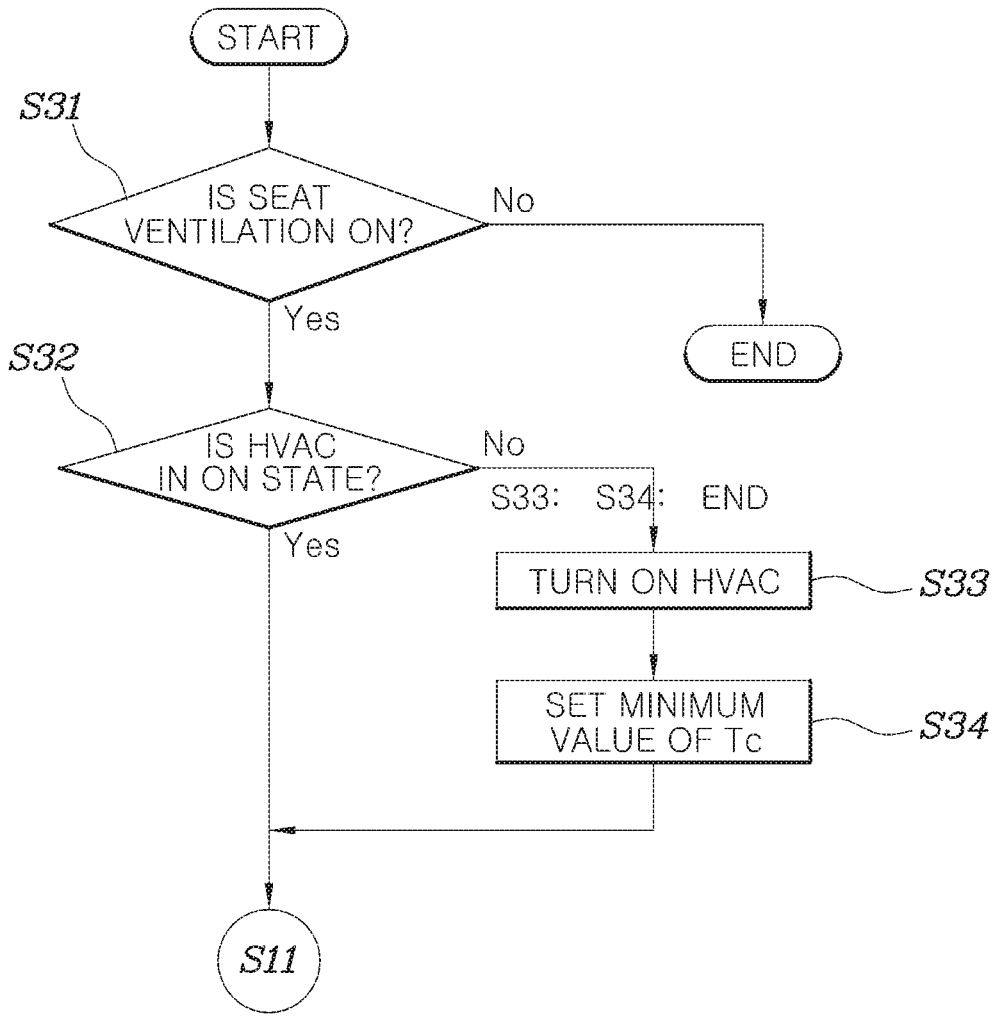

FIGS. 3 and 4 are flowcharts illustrating an actuation order depending on a state of a main air-conditioning system (HVAC) in the method for controlling the system for air-conditioning a seat for a vehicle according to one form of the present disclosure.

FIG. 3 illustrates an example in which the HVAC system is actuated through a manual input and before the temperature detecting step (S11), a step (S21) of determining an on/off state of the HVAC and a step (S22) of determining whether the blower 15 is actuated when the HVAC is in the on state may be performed. In this case, when the HVAC is in the off state, since the steps illustrated in FIG. 2 may not be performed, the control itself may end. Further, in step S22, when the blower 15 is actuated, that is, when the ventilation seat system 10 is in the on state, the temperature detecting step (S11) of FIG. 2 may be performed. In addition, when the blower 15 is not actuated, that is, when the ventilation seat system 10 is in the off state, the HVAC control unit 21 may determine a predetermined blow direction mode as the blow direction and may not perform the control depending on the temperature.

FIG. 4 illustrates an example in which an automatic operation of the HVAC system is available and before the temperature detecting step (S11) of FIG. 2, a step (S21) of determining whether the blower 15 is actuated and a step (S32) of determining the on/off state of the HVAC when the HVAC is actuated may be performed.

In this case, when the HVAC is in the off state, the HVAC control unit 21 turns on the HVAC (S33) and thereafter, sets the target temperature to a lowest temperature (S34) and step S11 of FIG. 2 may be performed. Further, in step S32, even when it is determined that the HVAC is in the on state, step S11 of FIG. 2 may be performed.

Meanwhile, in step S31 of determining whether the blower 15 is actuated, when a blower operation is not performed, the steps illustrated in FIG. 2 may not be performed, and as a result, the control itself may end.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system of air-conditioning a seat for a vehicle, the system comprising:
   a blower disposed below the seat of the vehicle and configured to blow air onto a body contact surface;
   a first temperature sensor configured to detect a temperature of a front end of a suction hole of the blower;
   a second temperature sensor configured to detect a temperature of the body contact surface;
   a third temperature sensor configured to detect a room temperature of the vehicle; and
   a heating, ventilation and air-conditioning (HVAC) control unit configured to control an air-conditioning system of the vehicle,
   wherein the HVAC control unit determines a blow direction mode of the air-conditioning system of the vehicle based on the temperatures detected by the first, the second, and the third temperature sensors when the blower is actuated,
   wherein the HVAC control unit controls the air-conditioning system of the vehicle, the air-conditioning system is configured to blow the air in a lower leg direction, when the room temperature is equal to or lower than a predetermined reference temperature, and the temperature of the body contact surface and the temperature of the front end of the suction hole of the blower are higher than the predetermined reference temperature.

2. The system of claim 1, wherein the HVAC control unit controls the air-conditioning system of the vehicle, the air-conditioning system is configured to blow the air in both a face direction and the lower leg direction, when the room temperature is higher than the predetermined reference temperature.

3. The system of claim 1, wherein the HVAC control unit controls the air-conditioning system of the vehicle in a predetermined blow direction mode when the room temperature is equal to or lower than the predetermined reference temperature and at least one of the temperature of the body contact surface or the temperature of the front end of the suction hole of the blower is equal to or lower than the predetermined reference temperature.

4. The system of claim 1, wherein the predetermined reference temperature is a target temperature pre-stored in the air-conditioning system of the vehicle.

5. A method for controlling a system of air-conditioning a seat for a vehicle, wherein the system includes a blower disposed below the seat of the vehicle and configured to blow air onto a body contact surface, and a heating, ventilation and air-conditioning (HVAC) control unit configured to control an air-conditioning system of the vehicle, the method comprising:
   detecting, by the HVAC control unit, a temperature of the body contact surface, a temperature of a front end of a suction hole of the blower, and a room temperature of the vehicle; and
   determining, by the HVAC control unit, a blow direction mode of an air-conditioning system of the vehicle based on temperatures detected by a first sensor, a second sensor, and a third temperature sensor when the blower is actuated,
   wherein the blow direction mode of the air-conditioning system of the vehicle is determined such that the air-conditioning system blow the air in a lower leg direction, when the room temperature is equal to or lower than a predetermined reference temperature, and the temperature of the body contact surface and the temperature of the front end of the suction hole of the blower are higher than the predetermined reference temperature.

6. The method of claim 5, wherein, the blow direction mode of the air-conditioning system of the vehicle is determined such that the air-conditioning system blows the air in both a face direction and the lower leg direction, when the room temperature is higher than the predetermined reference temperature.

7. The method of claim 5, wherein the blow direction mode of the air-conditioning system of the vehicle is determined such that the air-conditioning system operates in a predetermined blow direction mode, when the room temperature is equal to or lower than the predetermined reference temperature, and at least one of the temperature of the body contact surface or the temperature of the front end of the suction hole of the blower is equal to or lower than the predetermined reference temperature.

8. The method of claim 5, wherein the predetermined reference temperature is a target temperature pre-stored in the air-conditioning system of the vehicle.

9. The method of claim 5, further comprising:
   before detecting the temperatures,
      determining, by the HVAC control unit, an on/off state of the air-conditioning system of the vehicle, wherein when the air-conditioning system of the vehicle is in off state, detecting the temperatures and determining, by the HVAC control unit, the blow direction mode are not performed and a control ends; and
      determining, by the HVAC control unit, whether the blower is actuated when the air-conditioning system of the vehicle is in the on state, wherein when the blower is actuated, the HVAC control unit detects the temperatures, and when the blower is not actuated, the blow direction mode of the air-conditioning system of the vehicle is determined such that the air-conditioning system operates in a predetermined blow direction mode.

10. The method of claim 5, further comprising:
   before detecting the temperatures,
      determining, by the HVAC control unit, whether the blower is actuated, wherein when the blower is not actuated, the HVAC control unit stops controlling the air-conditioning system of the vehicle;
      determining, by the HVAC control unit, the on/off state of the air-conditioning system of the vehicle when the blower is actuated, wherein when the air-conditioning system of the vehicle is in the on state, the HVAC control unit detects the temperatures; and
      turning on, by the HVAC control unit, the air-conditioning system of the vehicle and setting, by the HVAC control unit, a temperature of the air-conditioning system of the vehicle to a lowest temperature when the air-conditioning system of the vehicle is in the off state, wherein the HVAC control unit detects the temperatures thereafter.

* * * * *

UNITED STATES PATENT AND TRADEMARK OFFICE
CERTIFICATE OF CORRECTION

PATENT NO. : 10,421,333 B2
APPLICATION NO. : 15/375636
DATED : September 24, 2019
INVENTOR(S) : Do Hyung Kim et al.

Page 1 of 1

It is certified that error appears in the above-identified patent and that said Letters Patent is hereby corrected as shown below:

On the Title Page

Please correct the Assignee information to reflect one Assignee only:
(73) Assignees: Hyundai Dymos Incorporated,
Seosan-si, Chungcheongnam-do (KR)

Signed and Sealed this
Twenty-first Day of April, 2020

Andrei Iancu
*Director of the United States Patent and Trademark Office*